US008602901B2

(12) United States Patent
Verhoog

(10) Patent No.: US 8,602,901 B2
(45) Date of Patent: Dec. 10, 2013

(54) DAMPER FOR COUPLING ROTATION OF MOTOR VEHICLE DRIVING SHAFTS

(75) Inventor: Roel Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 13/378,179

(22) PCT Filed: Jun. 4, 2010

(86) PCT No.: PCT/FR2010/051109
§ 371 (c)(1),
(2), (4) Date: Dec. 14, 2011

(87) PCT Pub. No.: WO2010/146280
PCT Pub. Date: Dec. 23, 2010

(65) Prior Publication Data
US 2012/0088589 A1    Apr. 12, 2012

(30) Foreign Application Priority Data

Jun. 18, 2009   (FR) ...................................... 09 54128

(51) Int. Cl.
*F16F 15/123* (2006.01)
(52) U.S. Cl.
USPC ...... 464/68.7; 464/67.1; 464/68.9; 192/213.2
(58) Field of Classification Search
USPC ................... 464/67.1, 68.1, 68.7, 68.8, 68.9; 192/213.1–213.31
See application file for complete search history.

(56) References Cited

U.S. PATENT DOCUMENTS

| 6,176,362 | B1 * | 1/2001 | Arhab .................. 192/213.1 |
| 6,371,857 | B1 | 4/2002 | Kono et al. |
| 7,017,724 | B2 * | 3/2006 | Hayabuchi et al. .... 192/213.2 X |
| 7,108,112 | B2 * | 9/2006 | Mizukami ............... 464/68.1 X |
| 7,267,211 | B2 * | 9/2007 | Yamashita et al. ........... 464/68.1 |
| 7,658,679 | B2 * | 2/2010 | Avins et al. ................ 464/68.1 |
| 8,057,310 | B2 * | 11/2011 | Reinhart et al. ............ 464/68.8 |
| 8,152,646 | B2 * | 4/2012 | Jameson et al. ............ 464/68.7 |
| 2007/0051577 | A1 * | 3/2007 | Avins et al. ........... 192/213.21 X |
| 2007/0240472 | A1 * | 10/2007 | Wack |

FOREIGN PATENT DOCUMENTS

DE   10 2008 032459   2/2009
DE   10 2008 045909   4/2009

\* cited by examiner

*Primary Examiner* — Gregory Binda
*Assistant Examiner* — Josh Skroupa
(74) *Attorney, Agent, or Firm* — Berenato & White, LLC

(57) ABSTRACT

The damper (12) includes first (14) and second (16) damping elements which are arranged in parallel by means of a connection disc (20). The first damping elements (14) comprise at least one first group (24) of resilient units (22) including at least two first resilient units (22) arranged in series by means of a first intermediate support element (26), and the second damping element (16) comprise at least one second group (34) of resilient units (32) comprising at least two second resilient units (32) arranged in series by means of a second intermediate support element (36). The damper includes at least one annular unit (39) for phasing of the resilient units (22, 32), which is distinct from the connection disc (20) and bears both the first (26) and second (36) intermediate support elements.

12 Claims, 3 Drawing Sheets

DAMPER FOR COUPLING ROTATION OF MOTOR VEHICLE DRIVING SHAFTS

CROSS-REFERENCE TO RELATED APPLICATIONS AND CLAIM TO PRIORITY

This application relates to International Application No. PCT/FR2010/051109 filed Jun. 4, 2010 and French Patent Application No. 09/54128 filed Jun. 18, 2009, of which the disclosures are incorporated herein by reference and to which priority is claimed.

FIELD OF THE INVENTION

The present invention relates to a damper, in particular for a device for coupling in rotation of a motor vehicle.

BACKGROUND OF THE INVENTION

According to the prior art, and in particular U.S. Pat. No. 6,372,857B1, a device is known for hydrokinetic coupling of two, drive and driven shafts, in particular for a motor vehicle.

In a conventional manner this hydrokinetic coupling device comprises:
a housing which is designed to connect the drive shaft and an impeller wheel in rotation;
a hub which is designed to connect in rotation the driven shaft and a turbine wheel, the turbine wheel being designed to be driven by the impeller wheel by means of circulation of a fluid contained in the housing;
a clutch to lock the coupling of the drive and driven shafts.

In the case of a motor vehicle automatic transmission, the drive shaft is the output shaft of the vehicle engine, and the driven shaft is connected to means for changing the gear ratio. After starting of the vehicle, the locking clutch, which is also known as the lock-up, makes it possible to avoid undesirable sliding between the wheels of the turbine and the impeller by rendering integral the driven shaft, which is connected to the turbine wheel, and the drive shaft, which is connected to the housing.

The coupling device comprises a damper which is designed to damp the noises and vibrations derived from the engine. This damper comprises first and second damping means which are arranged in parallel by means of a connection disc which is designed to be rendered integral in rotation with one of the drive or driven shafts.

The first damping means comprising resilient units which are distributed circumferentially around the axis of the drive and driven shafts. Each resilient unit extends circumferentially between first support seats which are supported by the connection disc.

The second damping means comprise groups of resilient units, each comprising at least two first resilient units which are arranged in series by means of a first intermediate support element, each group extending circumferentially between second support seats which are supported by the connection disc.

It will be noted that the rigidity of a damper of this type is generally to great to damp the vibrations efficiently in the case of transmission of a high level of torque between the engine and the means for changing the gear ratio of the motor vehicle, and in particular torque greater than 900 Nm (Newton metre).

The object of the invention is in particular to eliminate this disadvantage by providing an efficient damper in the case of transmission of a high level of torque, without modifying the dimensions of the damper.

SUMMARY OF THE INVENTION

For this purpose, the subject of the invention is a damper, in particular for a device for coupling of drive and driven units of a motor vehicle, comprising first and second damping means which are arranged in parallel by means of a connection disc which is designed to be rendered integral in rotation with one of the drive or driven units, wherein, according to the invention:
the first damping means comprise at least one first group of resilient units comprising at least two first resilient units arranged in series by means of a first intermediate support element;
the second damping means comprise at least one second group of resilient units comprising at least two second resilient units arranged in series by means of a second intermediate support element; and
the damper comprises at least one annular unit for phasing of the resilient units, which is distinct from the connection disc and bears both the first and second intermediate support elements.

The first and second damping means of the damper according to the invention each comprise resilient units in series. These can be straight or pre-curved resilient units. These groups of resilient units arranged in series make possible a large angular clearance of the damping means. As a result of this large angular clearance made possible, the resilient forces which are generated by the first and second damping means are reduced sufficiently to permit efficient damping, even in the case of transmission of a high level of torque.

In addition, thanks to the annular phasing unit, which bears all the intermediate elements against which the resilient units are supported, the groups of resilient units are deformed in phase with one another. Thus, the resilient forces which are generated by the groups of resilient units are distributed circumferentially and homogeneously around the axis, such that the radial component of these forces is substantially zero.

As a result of this substantially zero radial component, the friction of the resilient units on their seats is limited, which optimises the efficiency of these resilient units.

Another advantage of the deformation in phase of all the groups of resilient units is that the resonance frequency is the same for the first and second damping means. Thus, a single resonance frequency must be taken into account during the manufacture of the damper.

Finally, since the damper according to the invention needs only a single phasing unit common to the first and second damping means, this damper is more economical and less cumbersome than if it contained a different phasing unit for each damping means.

A damper according to the invention can additionally comprise one or a plurality of the following characteristics:
The first damping means comprise at least two, and preferably three or four first groups of resilient units, with the annular phasing unit bearing the first intermediate support element of each first group.
The second damping means comprise at least two, and preferably three or four second groups of resilient units, with the annular phasing unit bearing the second intermediate support element of each second. group.
The phasing unit comprises a washer, with a general form of revolution around an axis, each first intermediate support element being formed by a radially outer lug provided on this washer, and each second intermediate support element being formed by a radially inner lug arranged on this washer.

The phasing unit comprises a washer, with a general form of revolution around an axis, comprising at least one radially inner lug which forms both the first and the second intermediate support element.

The phasing unit comprises a washer, with a general form of revolution around an axis, comprising at least one radially outer lug which forms both the first and the second intermediate support element, The first and second groups of resilient units each comprise respectively two first and second resilient units, such that each first resilient unit of the first group extends between a first disc support seat and the first intermediate support element of this group, and each second resilient unit of the second group extends between a second disc support seat and the second intermediate support element of this group, The disc comprises at least one first window, the edges of which delimit circumferentially two first disc support seats between which the first group of resilient units extends, and at least one second window, the edges of which delimit circumferentially two second disc support seats between which the second group of resilient units extends, The damper comprises at least one guide washer comprising at least one first window, the edges of which delimit circumferentially two first guide washer support seats between which the first group of resilient units extends, and at least one second window, the edges of which delimit circumferentially two second disc support seats between which the second group of resilient units extends.

The invention also relates to a clutch for locking the coupling of drive and driven shafts of a hydrokinetic coupling device of a motor vehicle, characterised in that it comprises a damper as previously defined.

BRIEF DESCRIPTION OF THE DRAWINGS

The invention will be better understood by reading the following description, provided purely by way of example and with reference to the attached drawings, in which.

DETAILED DESCRIPTION

Figure 1:
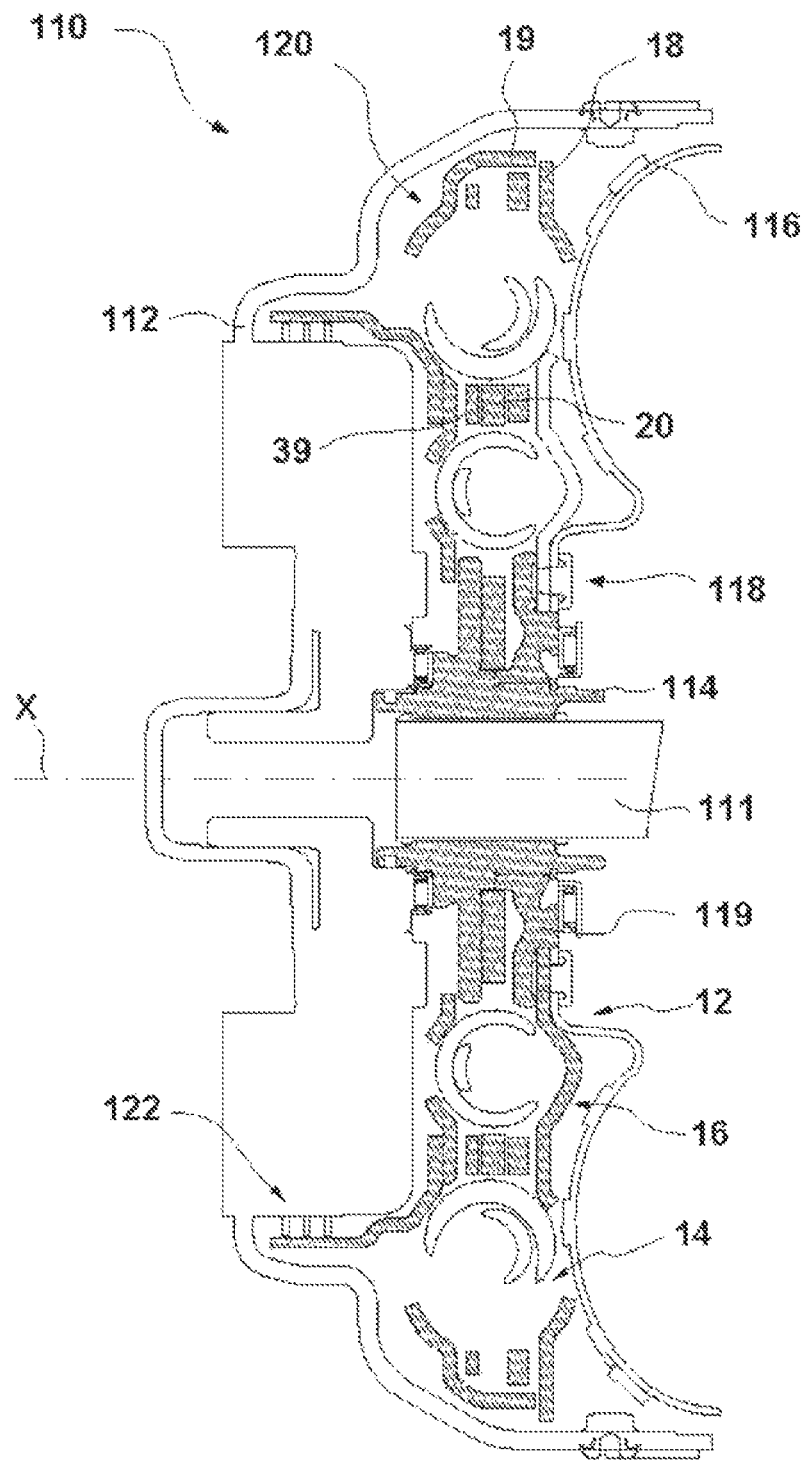
FIG. 1 is a view in axial cross-section of a hydrokinetic coupling device, comprising a locking clutch provided with a damper according to an embodiment of the invention.

FIG. 1 represents a hydrokinetic coupling device according to an embodiment of the invention, designated by the general reference 110.

This device 110 is designed to couple a drive shaft and a driven shaft 111, for example in an automatic transmission of a motor vehicle. In this case, the drive shaft is the output shaft of the vehicle engine, and the driven shaft is connected to gear ratio changing means.

Hereinafter the orientations axial and radial are considered relative to an axis X of the driven shaft 111.

In a conventional manner the hydrokinetic coupling device 110 comprises a housing 112, which is designed to connect in rotation the drive shaft and a impeller wheel. The drive shaft and the impeller wheel, which in themselves are known, are not represented in the figures.

The housing 112 is provided with conventional means for coupling with the drive shaft, These coupling means habitually comprise a centring unit and screwing means.

In addition, in a conventional manner, the impeller wheel is designed to rotate a turbine wheel 116, only part of the profile of which is represented in FIG. 1.

The hydrokinetic coupling device 110 additionally comprises a clutch 120 for locking the coupling of the drive and driven shafts. This clutch 120 is activated after starting of the vehicle and hydraulic coupling of the drive and driven shafts.

In a conventional manner the clutch 120 comprises a mobile locking unit 122 which is designed to co-operate directly or indirectly with the housing 112 in order to lock the coupling of the drive and driven shafts.

The device 110 also comprises a hub 114 which is coupled to the driven shaft 111 by co-operation of grooves and axial ribs provided respectively on this hub 114 and this driven shaft 111.

Figure 2:
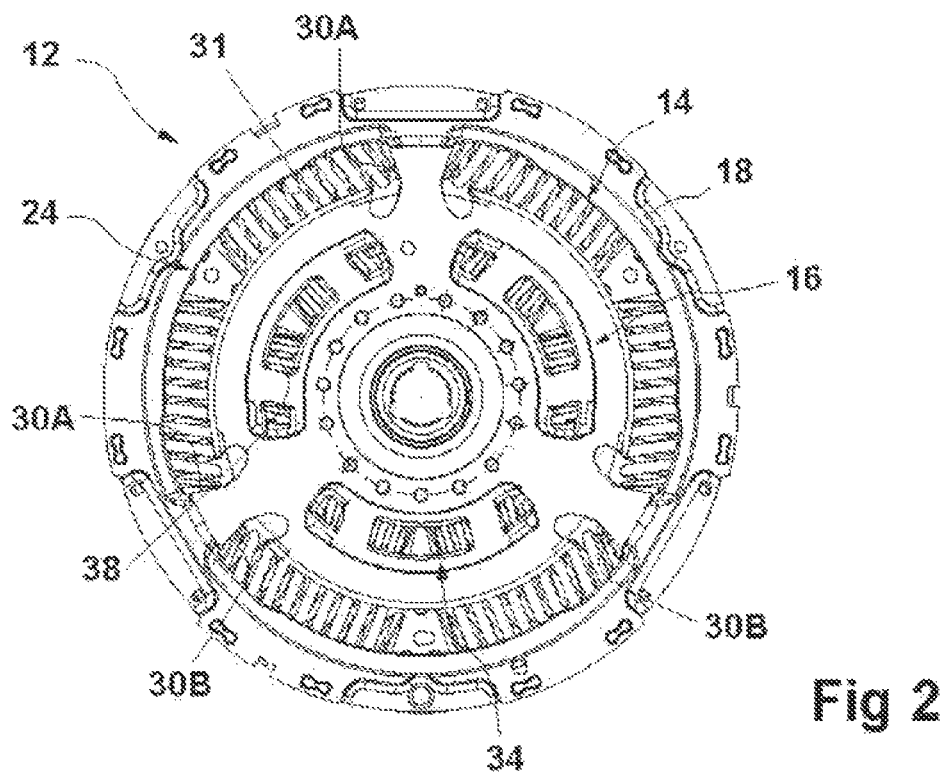
FIG. 2 is a front view of the damper of the device in FIG. 1.
Figure 3:
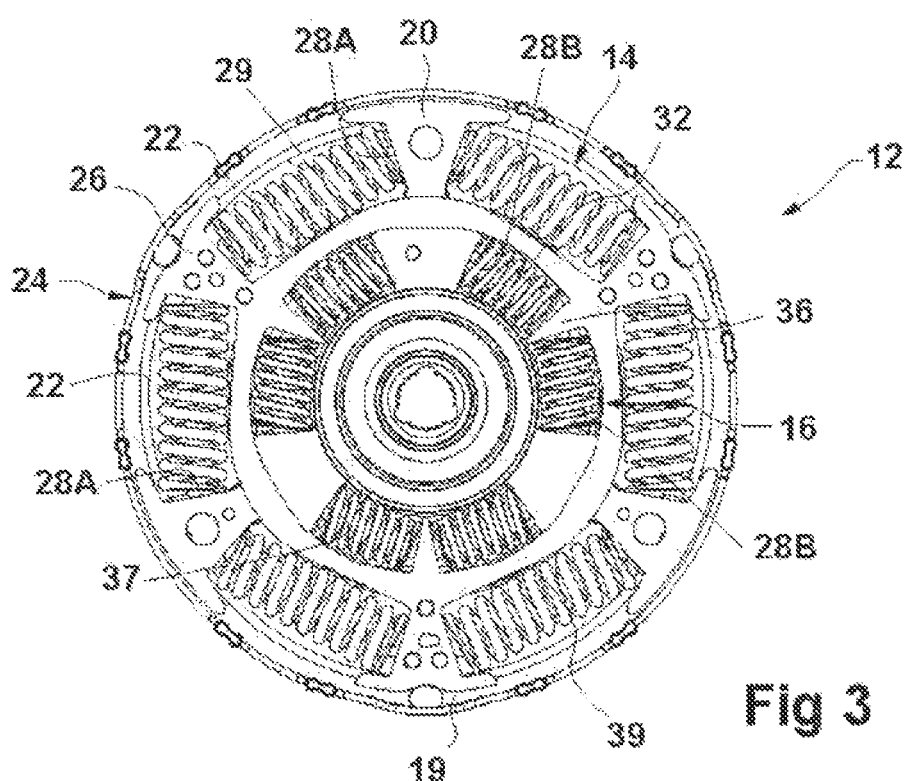
FIG. 3 is a view similar to FIG. 2 of the damper, from which a guide washer has been removed.

When the locking clutch 120 is activated, the hub 114 is rotated by the mobile locking unit 122 by means of a damper 12 which is represented in greater detail in FIGS. 2 and 3.

When the locking clutch 120 is not activated, the hub 114 is rotated by the turbine wheel 116 by means of the damper 12.

The damper 12 comprises first 14 and second 16 circumferential effect damping means which are arranged in parallel, and are designed to reduce the vibrations derived from the motor vehicle engine.

The damper 12 comprises first 18 and second 19 guide washers 18, which have general forms of revolution around the axis X and are rendered integral in rotation with one another.

The first guide washer 18 is rendered integral in rotation with the turbine wheel 116 by means of conventional securing means 118, for example by means of rivets. The first guide washer 18 and the turbine wheel 116 are also secured to a centring unit 119, which can rotate freely around the hub 114.

The second guide washer 19 is rendered integral in rotation with the mobile locking unit 122 by means of conventional securing means, for example by means of rivets. Thus, the guide washers 18 and 19 are rotated by the mobile locking unit 122 when the locking clutch 120 is active, and by the turbine wheel when 116 when this locking clutch 120 is not active.

The damper 12 also comprises a connection disc 20 with a general form of revolution around the axis X, which is rendered integral in rotation with the hub 114 by means of conventional means for rendering integral. The disc 20 is coupled resiliently to the guide washers 18 by means of the first 14 and second 16 damping means.

The first damping means 14 comprise first resilient units 22, and preferably three or four first groups 24 each comprising two first resilient units 22 which are arranged in series by means of a first intermediate support element 26. These three first groups 24 are distributed circumferentially around the axis X.

Each first group 22 of resilient units extends circumferentially between first disc support seats 28A, which are supported by the connection disc 20, and formed by edges of a window 29 provided in this connection disc 20. Each first group 22 of resilient units also extends circumferentially between first support seats 30A of guide washers which are supported by the guide washers 18, and are formed by edges of windows 31 provided in these guide washers 18.

The second damping means 16 comprise second resilient units 32, and preferably three or four second groups 34, each comprising two second resilient units 32 arranged in series by means of a second intermediate support element 36. These three second groups 34 are distributed circumferentially around the axis X.

Each second group 32 of resilient units extends circumferentially between second disc support seats 28B which are supported. by the connection disc 20, and are formed by edges of a window 37 provided in this connection disc 20. Each second group 32 of resilient units also extends circumferentially between second guide washer support seats 30B, which are supported by the guide washers 18 and are formed by edges of windows 38 provided in these guide washers 18.

According to the embodiment described, the first resilient units 22 are distributed circumferentially around second resilient units 32, in addition, the rigidity of each first resilient unit 22 is preferably greater than the rigidity of each second resilient unit 32.

The resilient units 22, 32 of each group are arranged in series without friction by means of an annular unit 39, for phasing of the resilient units 22, 32, which unit is distinct from the connection disc 20. As shown in FIG. 1, the connection disc 20 and the annular phasing unit 39 are disposed between the first and second guide washers 18 and 19. This annular phasing unit 39 comprises a washer comprising radially outer lugs 26 which each form a first intermediate support element 26 which is designed to be interposed between two consecutive first resilient units 22 of a first group of resilient units 24 so as to be in contact with one of axially distal ends of each of the two first consecutive resilient units 22.

The washer of the annular phasing unit 39 also comprises radially inner lugs 36 which each form a second intermediate support element 36 which is designed to be interposed between two second consecutive resilient units 32 of a second group of resilient units 34 so as to be in contact with one of axially distal ends of each of the two second consecutive resilient units 32.

Since the first 26 and second 36 intermediate support elements are all supported by the same annular phasing unit 39, the first 24 and second 34 groups of resilient units are deformed in phase with one another. The resilient forces which are generated by the first 14 and second 16 damping means are thus distributed circumferentially and homogeneously.

Finally, it will be noted that the invention is not limited to the embodiment previously described.

Figure 4:
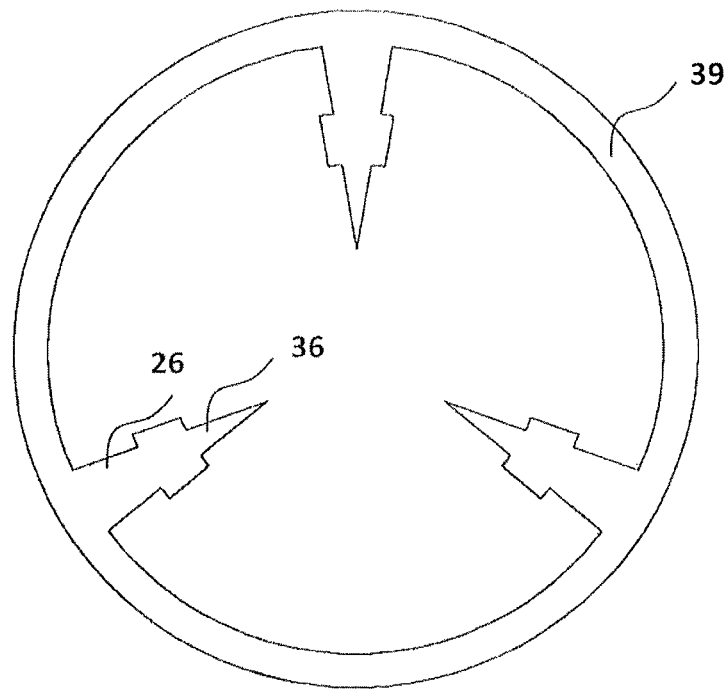
FIG. 4 is a front view of a phasing unit comprising an annular washer according to a variant of the device in FIG. 3.

In fact, as a variant, the phasing unit 39 could comprise an annular washer which surrounds both the first 22 and second 32 resilient units. In this case, the annular washer would comprise radially inner lugs which each form both a first 26 and a second 36 intermediate support element, as shown in FIG. 4.

Figure 5:
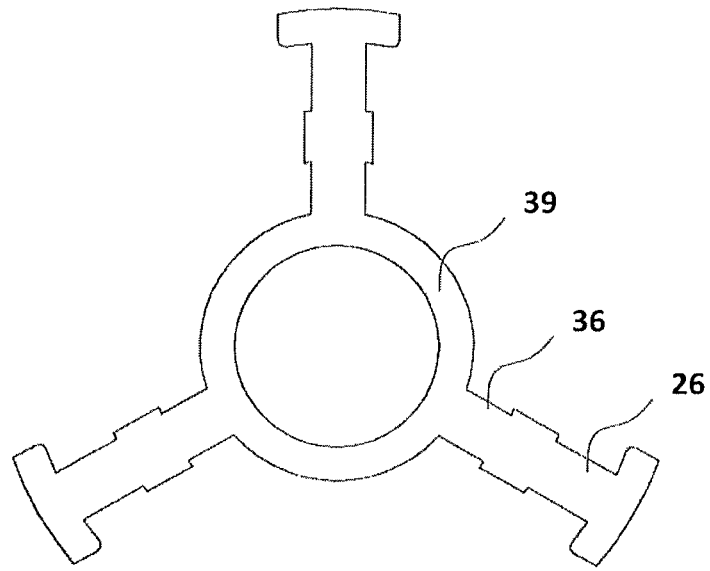
FIG. 5 is a front view of the phasing unit comprising the annular washer according to another variant of the device in FIG. 3.

According to another variant, the phasing unit 39 could comprise an annular washer which is surrounded both by the first 22 and second 32 resilient units. In this case, the annular washer would comprise radially outer lugs which each form both a first 26 and a second 36 intermediate support element, as shown in FIG. 5.

It will also be noted that the damper 12 could also equip any other device for coupling in rotation of a motor vehicle, such as a double-damping flywheel or a clutch disc.

The invention claimed is:

1. A damper (12), for coupling in rotation drive and driven shafts of a motor vehicle, comprising:
    first (14) and second (16) damping means arranged in parallel by means of a connection disc (20) integral in rotation with the drive shaft or driven shaft;
    the first damping means (14) comprising at least one first group (24) of resilient units (22) comprising at least two first resilient units (22) arranged in series by means of a first intermediate support element (26);
    the second damping means (16) comprising at least one second group (34) of resilient units (32) comprising at least two second resilient units (32) arranged in series by means of a second intermediate support element (36); and
    at least one annular unit (39) for phasing of the first and second resilient units (22, 32), the at least one annular unit (39) being distinct from the connection disc (20) and supporting both the first (26) and second (36) intermediate support elements.

2. The damper (12) according to claim 1, wherein the first damping means (14) and the second damping means (16) comprise at least two groups (24; 34) of resilient units, with the annular phasing unit (39) bearing the first intermediate support element (26) and the second intermediate support element (36) of each group (24; 34).

3. The damper (12) according to claim 1, wherein the phasing unit (39) comprises a washer, with a general annular form around an axis (X) of revolution of the damper, each first intermediate support element (26) being formed by a radially outer lug radially outwardly extending from the washer, and each second intermediate support element (36) being formed by a radially inner lug radially inwardly extending from the washer.

4. The damper (12) according to claim 1, wherein the phasing unit (39) comprises a washer, with a general annular form around an axis (X) of revolution of the damper, the washer comprises at least one radially inner lug which forms both the first (26) and the second (36) intermediate support elements.

5. A damper (12) according to claim 1, wherein the phasing unit (39) comprises a washer, with a general annular form around an axis (X) of revolution of the damper, the washer comprises at least one radially outer lug which forms both the first (26) and the second (36) intermediate support elements.

6. The damper (12) according to claim 1, wherein the first (24) and second (34) groups of resilient units each comprise respectively two first (22) and second (32) resilient units, such that:
    each of the first resilient units (22) of the first group (24) extends between a first disc support seat (28A) and the first intermediate support element (26) of this group (24);
    each of the second resilient units (32) of the second group (34) extends between a second disc support seat (28B) and the second intermediate support element (36) of this group (34).

7. The damper (12) according to claim 6, wherein the connection disc (20) comprises:
    at least one first window (29), edges of which delimit circumferentially two first disc support seats (28A) between which the first group (24) of resilient units extends; and
    at least one second window (37), edges of which delimit circumferentially two second disc support seats (28B) between which the second group (34) of resilient units extends.

8. The damper (12) according to claim 1, comprising first and second guide washers (18, 19) integral in rotation with one another, the first guide washer (18) resiliently coupled to the connection disc (20) by means of the first and second damping means, wherein the first guide washer (18) comprises:
- at least one first window (31), edges of which delimit circumferentially two first guide washer support seats (30A) between which the first group (24) of resilient units extends; and
- at least one second window (38), edges of which delimit circumferentially two second guide washer support seats (30B) between which the second group (34) of resilient units extends.

9. The damper (12) according to claim 8, wherein the first and second guide washers (18, 19) are rotatable relative to the drive or driven shafts.

10. The damper (12) according to claim 1, wherein the first group (24) of resilient units (22) and/or the second group (34) of resilient units (32) comprise at least one straight spring.

11. The damper (12) according to claim 1, wherein the first group (24) of resilient units (22) and/or the second group (34) of resilient units (32) comprise at least one pre-curved spring.

12. The damper according to claim 1, further comprising a hydrokinetic coupling device of the motor vehicle.-

\* \* \* \* \*